(12) United States Patent
Hsu et al.

(10) Patent No.: US 9,081,923 B1
(45) Date of Patent: Jul. 14, 2015

(54) COMPUTER-IMPLEMENTED COMPOSITE SIMULATION METHOD AND NON-TRANSITORY COMPUTER MEDIUM FOR USE IN MOLDING PROCESS

(71) Applicant: CORETECH SYSTEM CO., LTD., Chupei (TW)

(72) Inventors: Chih Chung Hsu, Zhubei (TW); Rong Yeu Chang, Hsinchu (TW); Chia Hsiang Hsu, Zhubei (TW); Tsai Hsin Hsieh, Chupei (TW)

(73) Assignee: CORETECH SYSTEM CO., LTD., Chupei (TW)

( * ) Notice: Subject to any disclaimer, the term of this patent is extended or adjusted under 35 U.S.C. 154(b) by 0 days.

(21) Appl. No.: 14/460,335

(22) Filed: Aug. 14, 2014

(51) Int. Cl.
*G06G 7/50* (2006.01)
*G06F 17/50* (2006.01)

(52) U.S. Cl.
CPC ........ *G06F 17/5018* (2013.01); *G06F 2217/16* (2013.01)

(58) Field of Classification Search
CPC .................. G06F 2217/16; G06F 17/5018
USPC ............................................................ 703/9
See application file for complete search history.

(56) References Cited

U.S. PATENT DOCUMENTS

| | | | |
|---|---|---|---|
| 8,463,584 B2* | 6/2013 | Yu ..................................... | 703/9 |
| 2010/0292970 A1* | 11/2010 | Brincat et al. ..................... | 703/6 |
| 2012/0059637 A1* | 3/2012 | Yu ..................................... | 703/6 |
| 2012/0209580 A1* | 8/2012 | Tisne et al. ........................ | 703/9 |

OTHER PUBLICATIONS

Lu'isa Alexandra Rocha Da Silva, "Viscoelastic Compressible Flow and Applications in 3D Injection Molding Simulation", Ecole Doctorale 364: Sciences Fondamentales et Appliqu'ees, Dec. 2004.*
Hamsin et al, "Design andAnalysis of Multi-CavityTraditional andH-branching runners for PlasticInjection Mold", Department of Engineering Design and Manufacture, 2007.*

* cited by examiner

*Primary Examiner* — David Silver
(74) *Attorney, Agent, or Firm* — Hamre, Schumann, Mueller & Larson, P.C.

(57) ABSTRACT

A computer-implemented method for use in a molding process by a computer processor includes specifying a simulating domain having a cavity part and a runner part; setting a filling condition of the cavity part without taking into consideration the runner part, wherein the filling condition includes gate pressures and filling rates of the cavities of the cavity part; and performing a steady state analysis to calculate flow conditions of a plurality of runner designs for the runner part by taking into consideration the filling condition of the cavity part, wherein the flow conditions include flow rates of a molding material in the runners of the runner part.

12 Claims, 17 Drawing Sheets

COMPUTER-IMPLEMENTED COMPOSITE SIMULATION METHOD AND NON-TRANSITORY COMPUTER MEDIUM FOR USE IN MOLDING PROCESS

TECHNICAL FIELD

The present disclosure relates to a computer-implemented composite simulation method and non-transitory computer medium for use in a molding process.

DISCUSSION OF THE BACKGROUND

In general, the setting of molding conditions in an injection molding machine requires a large number of trial molding operations and a long setting time because the setting work greatly depends on the know-how and experience of an operator of the injection molding machine, and various physical values affect one another as well.

Therefore, a virtual molding, i.e., computer-implemented simulation, by use of CAE (Computer-Assisted Engineering) is performed for the injection molding, and the molding conditions are then set based on the virtual molding. In virtual molding by use of CAE, phenomena will occur in a mold cavity within a short period of time; i.e., the result of simulation on resin temperature, pressure, shear rate, etc. can be reflected in molded products. Therefore, if the molding phenomena occurring within a mold cavity can be grasped accurately, using CAE may enable optimization of molding conditions and a stable molding of non-defective products.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

The present disclosure provides a computer-implemented composite simulation method and non-transitory computer medium for use in a molding process.

In accordance with some embodiments of the present disclosure, a computer-implemented composite simulation method for use in a molding process by a computer processor comprises steps of specifying a simulating domain having a cavity part and a runner part, wherein the cavity part comprises a first cavity and a second cavity, and the runner part comprises a first runner connected to the first cavity through a first gate and a second runner connected to the second cavity through a second gate; setting a filling condition of the cavity part without taking into consideration the runner part, wherein the filling condition comprises a first gate pressure and a first filling rate of the first cavity, and a second gate pressure and a second filling rate of the second cavity; and performing a steady state analysis to calculate flow conditions of a plurality of runner designs for the runner part by taking into consideration the filling condition of the cavity part, wherein the flow conditions comprise a first flow rate of a molding material in the first runner and a second flow rate of the molding material in the second runner.

In accordance with some embodiments of the present disclosure, a non-transitory computer medium contains computer instructions stored therein for causing a computer processor to perform operations for use in a molding process simulation, and the operations comprise steps of specifying a simulating domain having a cavity part and a runner part, wherein the cavity part comprises a first cavity and a second cavity, and the runner part comprises a first runner connected to the first cavity through a first gate and a second runner connected to the second cavity through a second gate; setting a filling condition of the cavity part without taking into consideration the runner part, wherein the filling condition comprises a first gate pressure and a first filling rate of the first cavity, and a second gate pressure and a second filling rate of the second cavity; and performing a steady state analysis to calculate flow conditions of a plurality of runner designs for the runner part by taking into consideration the filling condition of the cavity part, wherein the flow conditions comprise a first flow rate of a molding material in the first runner and a second flow rate of the molding material in the second runner.

Conventionally, the transient state analysis is performed to the full mold including the cavity part and the runner part. In the transient state analysis, the process variables that change with time are not zero; however, the numerical simulation using the transient state analysis (full simulation method) takes time.

In the steady state analysis in some embodiments of the present disclosure, the process variables that change with time are considered zero for the runner part. By assuming the flow of the molding material in the runner part is in the steady state, the embodiments of the present disclosure simplify the numerical simulation of the runner part. Compared to the conventional full simulation method, the computing time can be dramatically decreased by using the composite simulation method according to some embodiments of the present disclosure.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "some embodiments," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a computer-implemented composite simulation method and a non-transitory computer medium for use in a molding process by a computer processor. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Figure 1:
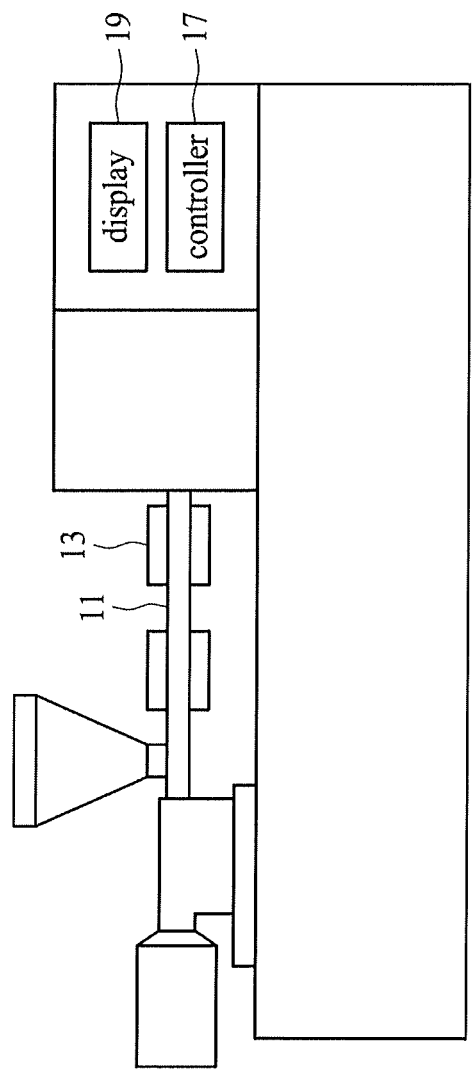
FIG. 1 and FIG. 2 are schematic views of an injection molding machine equipped with a mold in accordance with various embodiments of the present disclosure.
Figure 2:
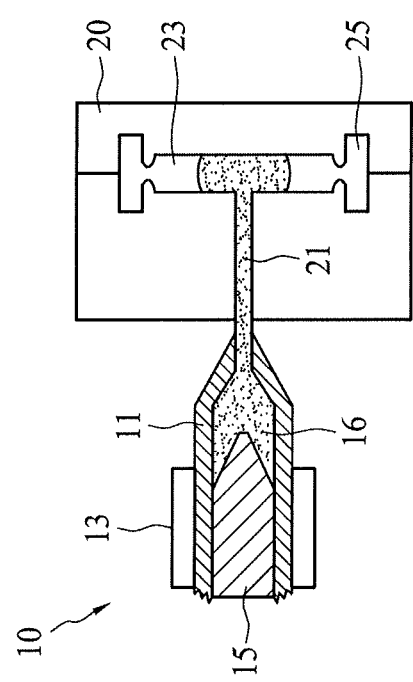

FIG. 1 and FIG. 2 are schematic views of an injection molding machine 10 equipped with a mold 20 in accordance with various embodiments of the present disclosure. The mold 20 includes a sprue 21, a runner part 23 and a cavity part 25. The injection molding machine 10 includes a screw chamber 11, heating elements 13 configured to heat the screw chamber 11, and a screw 15 positioned in the screw chamber 11 for feeding a molding material 16 such as thermoplastics into the mold cavity 25 of the mold 20. The injection machine 10 has a controller 17 configured to control the operation of the injection molding machine 10 and a display 19 configured to display information of the injection molding process.

Figure 3:
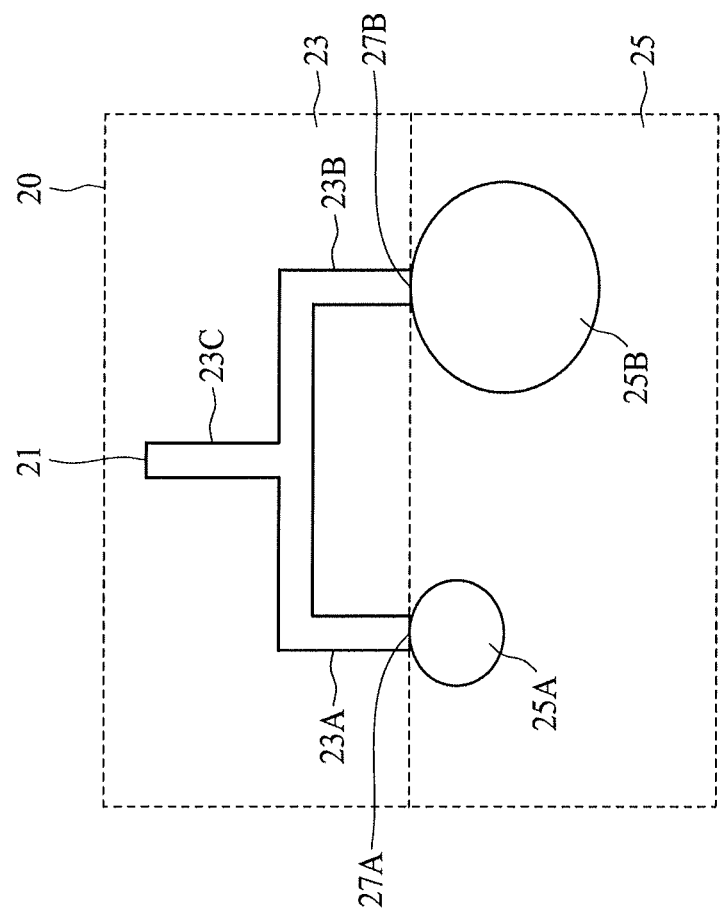
FIG. 3 is a schematic view of the mold in accordance with various embodiments of the present disclosure.

FIG. 3 is a schematic view of the mold 20 in accordance with various embodiments of the present disclosure. In some embodiments, the cavity part 25 of the mold 20 comprises a first cavity 25A and a second cavity 25B; the runner part 23 of the mold 20 comprises a first runner 23A connected to the first cavity 25A through a first gate 27A, a second runner 23B connected to the second cavity 25B through a second gate 27B, and a master runner 23C connected to the first runner 23A and the second runner 23B. In one embodiment of the present disclosure, the first cavity 25A has a first volume, and the second cavity 25B has a second volume smaller than the first volume.

Figure 4:
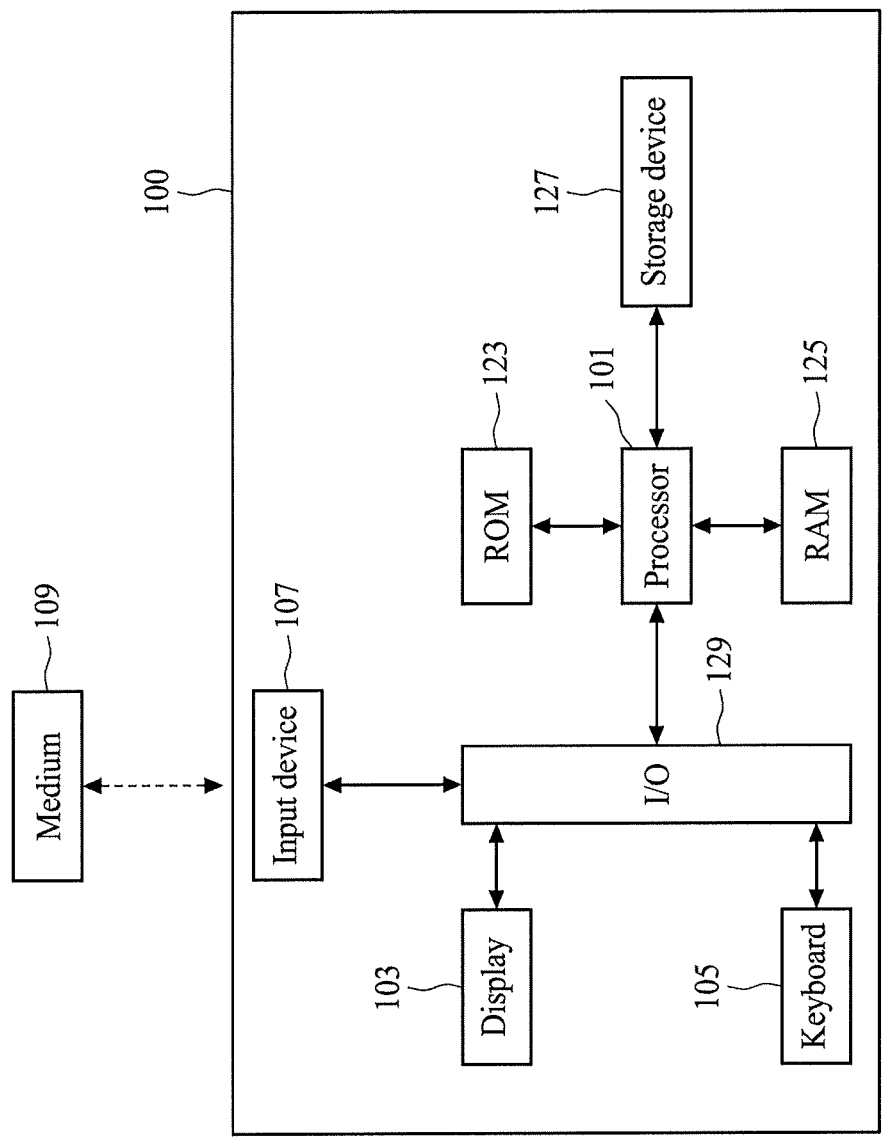
FIG. 4 is a functional block diagram of a computer in accordance with various embodiments of the present disclosure.

FIG. 4 is a functional block diagram of a computing apparatus 100 in accordance with various embodiments of the present disclosure. In some embodiments, the computing apparatus 100 comprises a computer processor 101 for performing a computer-implemented injection molding simulation method. In some embodiments, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments, the computing apparatus 100 may further include a display 103, a keyboard 105, and an input device 107 such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory device, i.e., the ROM 123 and the RAM 125, can be programmed to store codes for performing the computer-implemented injection molding simulation method.

Figure 5:
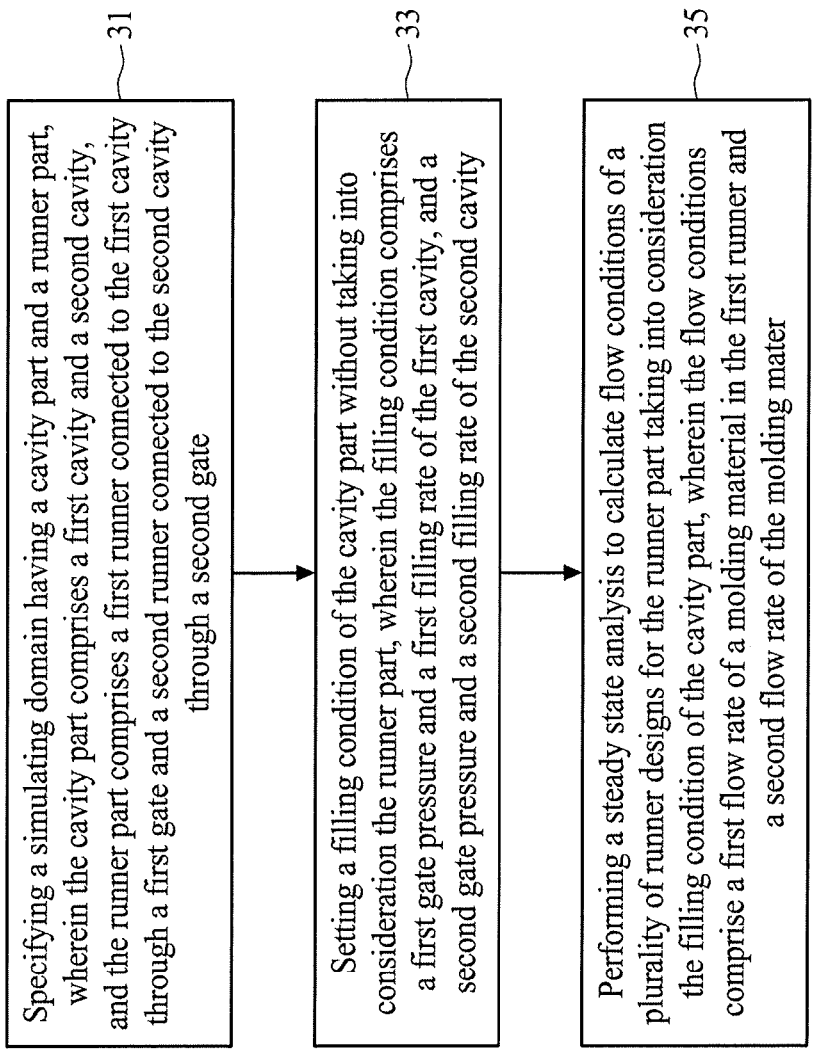
FIG. 5 is a flow chart of the computer-implemented composite simulation method for use in a molding process in accordance with some embodiments of the present disclosure.

FIG. 5 is a flow chart of the computer-implemented composite simulation method 30 for use in a molding process in accordance with some embodiments of the present disclosure. The composite simulation method comprises a step 31 of specifying a simulating domain having a cavity part and a runner part, wherein the cavity part comprises a first cavity and a second cavity, and the runner part comprises a first runner connected to the first cavity through a first gate and a second runner connected to the second cavity through a second gate; a step 33 of setting a filling condition of the cavity part without taking into consideration the runner part, wherein the filling condition comprises a first gate pressure and a first filling rate of the first cavity, and a second gate pressure and a second filling rate of the second cavity; and a step 35 of performing a steady state analysis to calculate flow conditions of a plurality of runner designs for the runner part by taking into consideration the filling condition of the cavity part, wherein the flow conditions comprise a first flow rate of a molding material in the first runner and a second flow rate of the molding material in the second runner.

The following describes an exemplary process flow of the injection molding simulation method 30 in accordance with various embodiments of the present disclosure.

Figure 6:
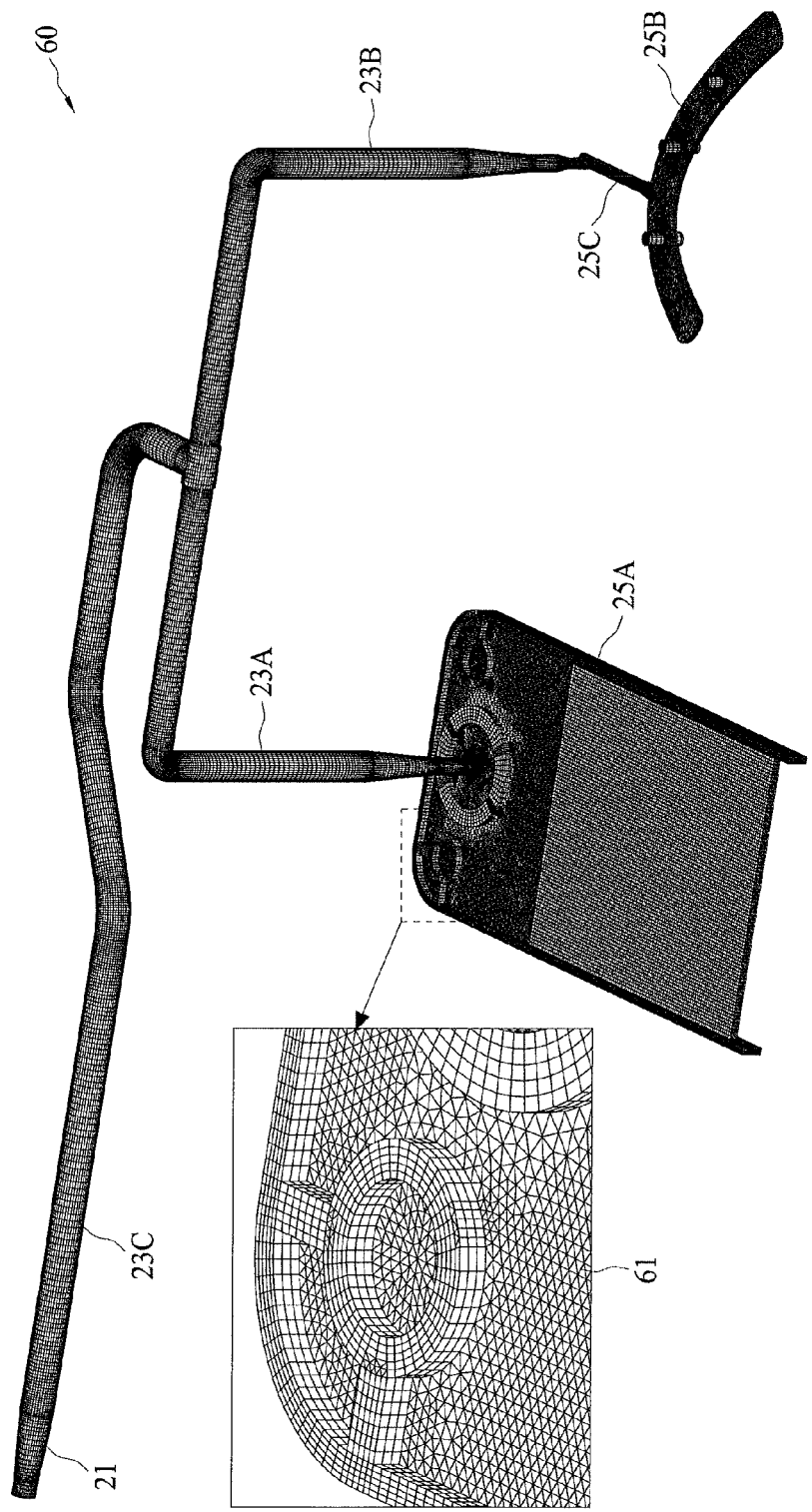
FIG. 6 is a schematic view of a simulating domain in accordance with various embodiments of the present disclosure.

FIG. 6 is a schematic view of a simulating domain 60 in accordance with various embodiments of the present disclosure. In some embodiments, the injection molding simulation method 30 can begin in the step 31 where the simulating domain 60 is specified. In some embodiments, the simulating domain 60 is obtained from a CAD (Computer Aided Design) model used in design and development of a product.

In some embodiments, a mesh is created by dividing at least part of the simulating domain 60 before actually applying a numerical analysis, such as an FEM (finite element method), an FDM (finite difference method) or an FVM (finite volume method), to the simulating domain 60. The creation of the mesh 60 is a technique of modeling an object or fluid region (i.e., the simulating domain 60 of the present embodiment) to be analyzed with a set of elements 61, such as rectangular mesh, hexahedral mesh or tetrahedral mesh, in order to perform the subsequent numerical analysis.

In the step 33, a filling condition of the cavity part 25 is set without taking into consideration the runner part 23, wherein the filling condition comprises a first gate pressure ($P_A$) and a first filling rate ($Q_A$) of the first cavity 23A, and a second gate pressure ($P_B$) and a second filling rate ($Q_B$) of the second cavity 23B. The molding phenomena of the molding material 16 in the cavity part 25 can be simulated by using the following governing equations (1)-(4).

$$\frac{\partial \rho}{\partial t} + \nabla \cdot \rho u = 0 \qquad (1)$$

$$\frac{\partial}{\partial t}(\rho u) + \nabla \cdot (\rho u u + \tau) = -\nabla p + \rho g \qquad (2)$$

$$\rho C_P \left( \frac{\partial T}{\partial t} + u \cdot \nabla T \right) = \nabla (k \nabla T) \eta \dot{\gamma}^2 \qquad (3)$$

$$\tau = -\eta(T, \dot{\gamma}) \cdot (\nabla u + \nabla u^T) \qquad (4)$$

where u represents the velocity vector (flow velocity), T represents the temperature, t represents the time, p represents the pressure, $\tau$ represents the total stress tensor, $\rho$ represents the density, $\eta$ represents the viscosity, k represents the thermal conductivity, $C_P$ represents the specific heat, and $\dot{\gamma}$ represents the shear rate.

The solving of the governing equations (1)-(4) is a transient state analysis, which can be performed numerically by using the computer. See, e.g., Rong-yeu Chang, and Wen-hsien Yang, Numerical simulation of mold filling in injection molding using a three-dimensional finite volume approach, International Journal for Numerical Methods in Fluids Volume 37, Issue 2, pages 125-148, Sep. 30, 2001, and the entirety of which is herein incorporated by reference.

Figure 7:
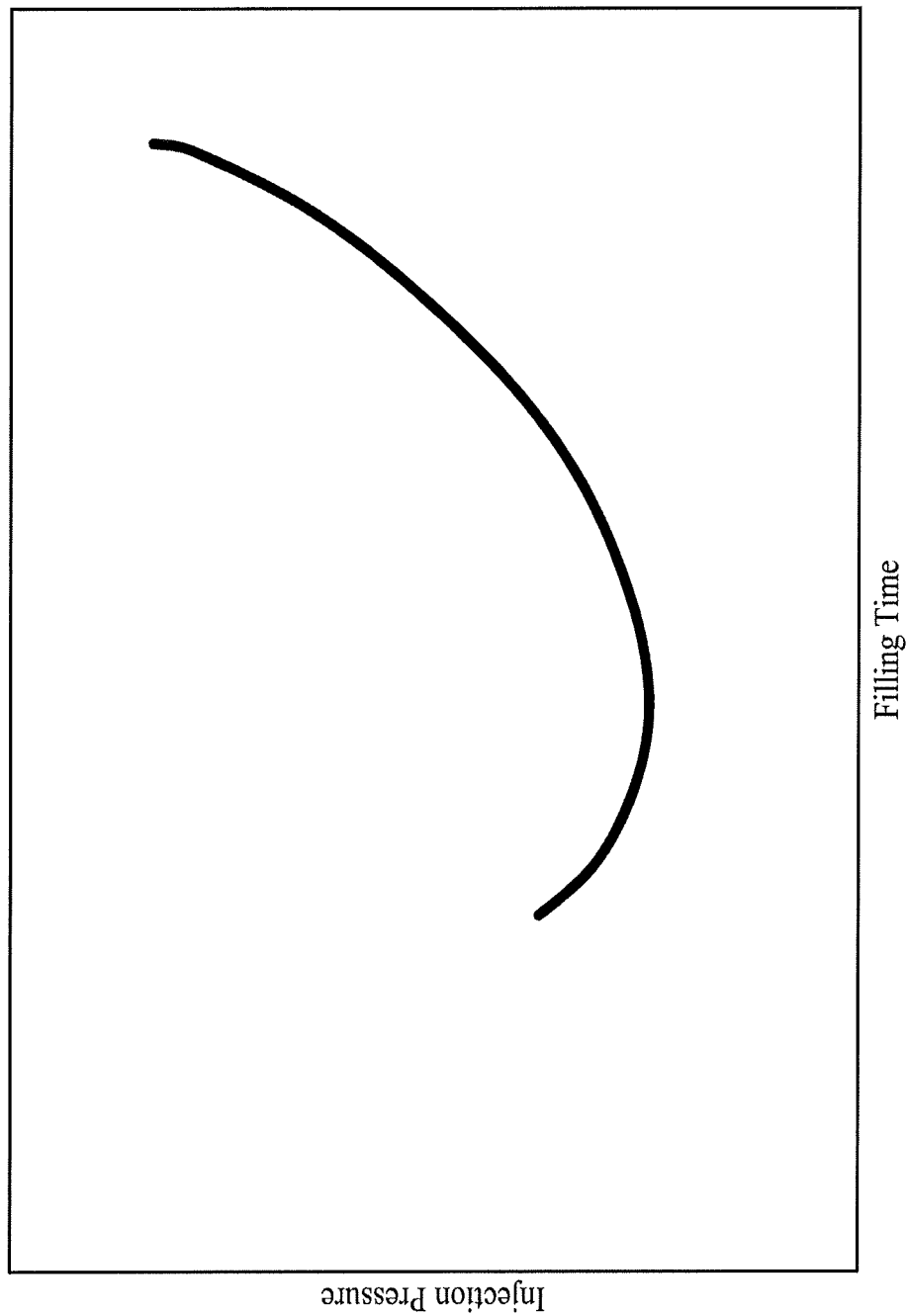
FIG. 7 is a plot showing the correlation between the injection pressure and the filling time.

FIG. 7 is a plot showing the correlation between the injection pressure and the filling time. For injection molding, if the injection pressure required to fill the cavity is plotted against the filling time, a U-shaped curve typically results, with the minimum value of the required injection pressure occurring at an intermediate filling time, as illustrated below. The curve is U-shaped because, on one hand, a short fill time involves a high melt viscosity and thus requires a higher injection pressure to fill the mold. On the other hand, the injected polymer cools more with a prolonged fill time, which results in a higher melt viscosity and thus requires a higher injection pressure to fill the mold. The shape of the curve of injection pressure versus fill time depends very much on the material used, as well as on the cavity geometry and mold design.

Figure 8:
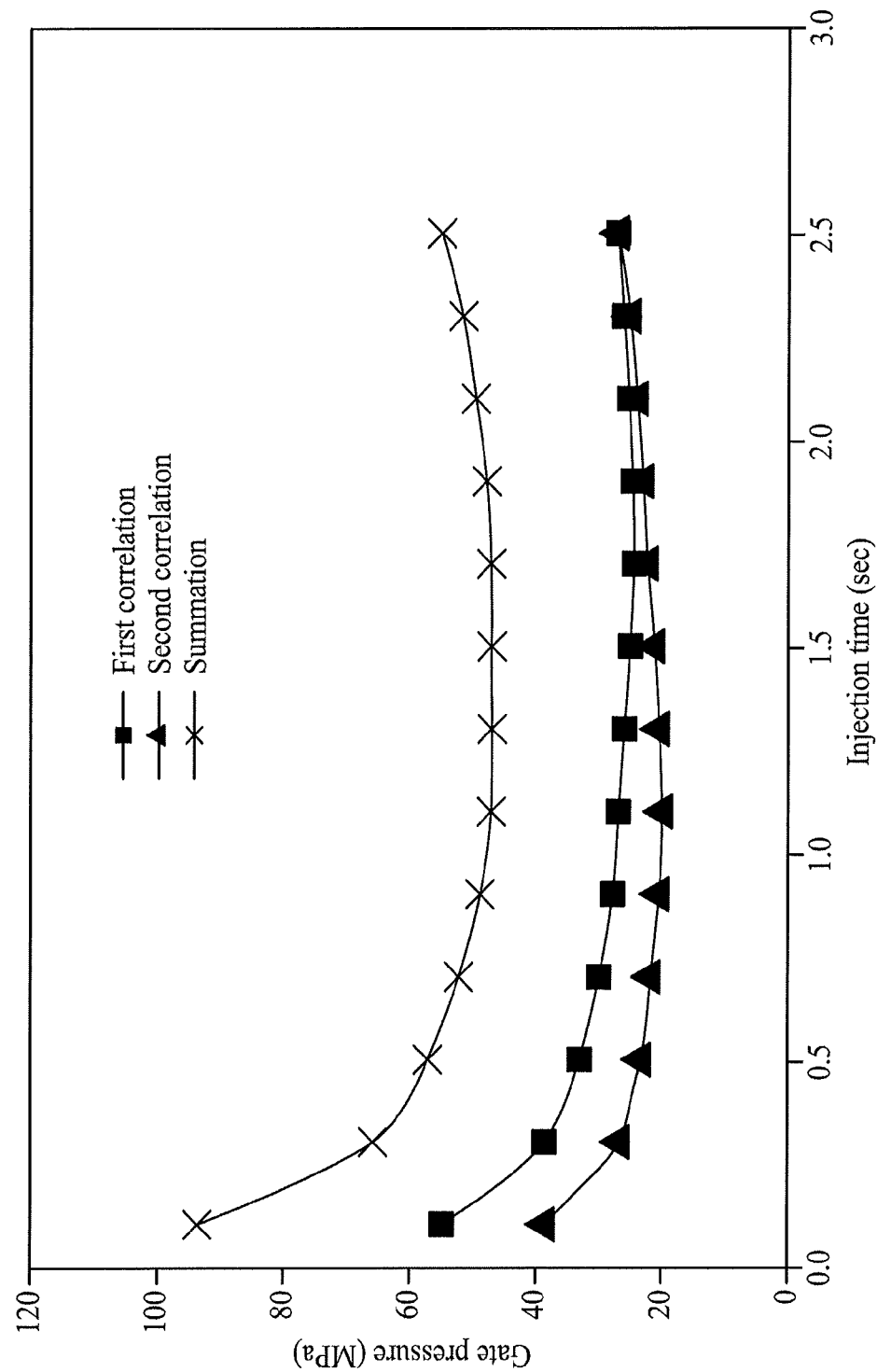
FIG. 8 is a plot showing the correlation between the injection (gate) pressure and the filling time for the cavity part in accordance with various embodiments of the present disclosure

FIG. 8 is a plot showing the correlation between the injection (gate) pressure and the filling time for the cavity part 25 in accordance with various embodiments of the present disclosure. By setting the filling time and the volume of the cavity, the filling rate (Q) can be calculated, the velocity vector (u) of the gate in the governing equations is specified, and solving the governing equations (1)-(4) can generate a corresponding pressure.

By setting different filling times, solving the governing equations (1)-(4) can generate corresponding gate pressures, and the correlation between the injection (gate) pressure and the filling time for the cavity part 25 can be acquired. In some embodiments, the transient state analysis comprises generating a first correlation between the first gate pressure ($P_A$) and the first filling rate ($Q_A$) of the first cavity 25A and a second correlation between the second gate pressure ($P_B$) and the second filling rate ($Q_B$) of the second cavity 25B. In some embodiments, the transient state analysis sets a filling time of the cavity part 25 by taking into consideration a first minimum pressure of the first correlation and a second minimum pressure of the second correlation.

Figure 9:
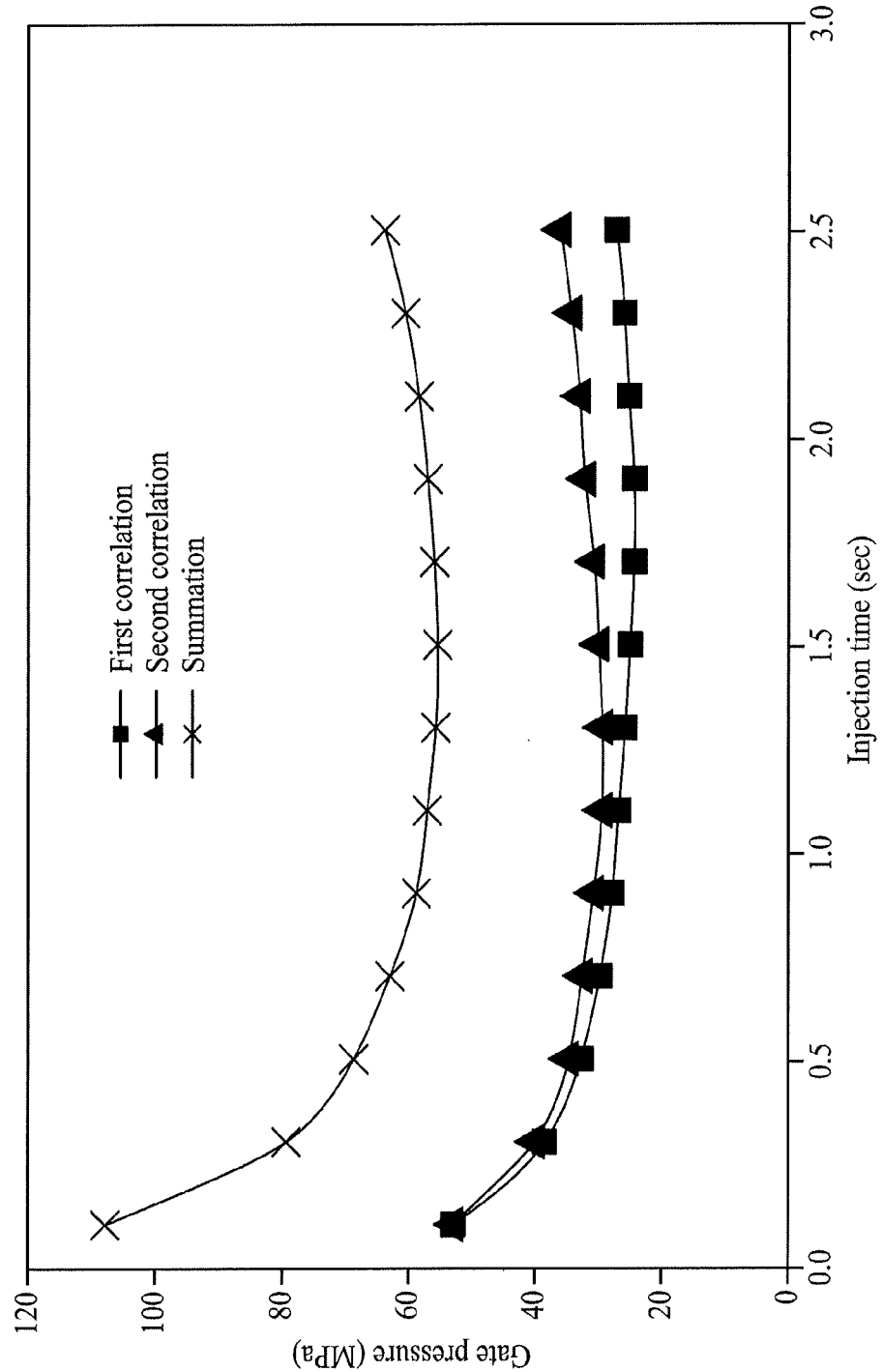
FIG. 9 is a plot showing the correlation between the injection (gate) pressure and the filling time for the cavity part in accordance with various embodiments of the present disclosure.
Figure 10:
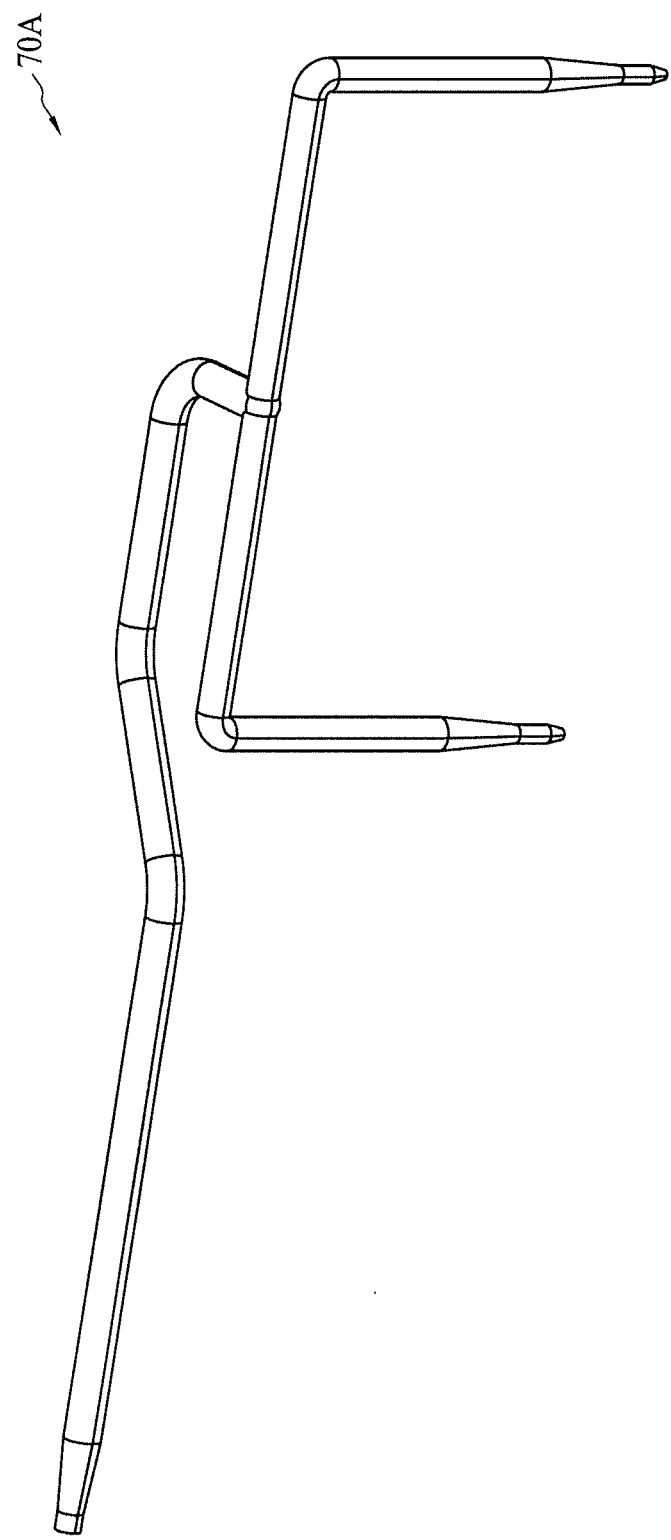
FIGS. 10-15 are schematic views of a plurality of runner designs for the runner part in accordance with various embodiments of the present disclosure.
Figure 11:
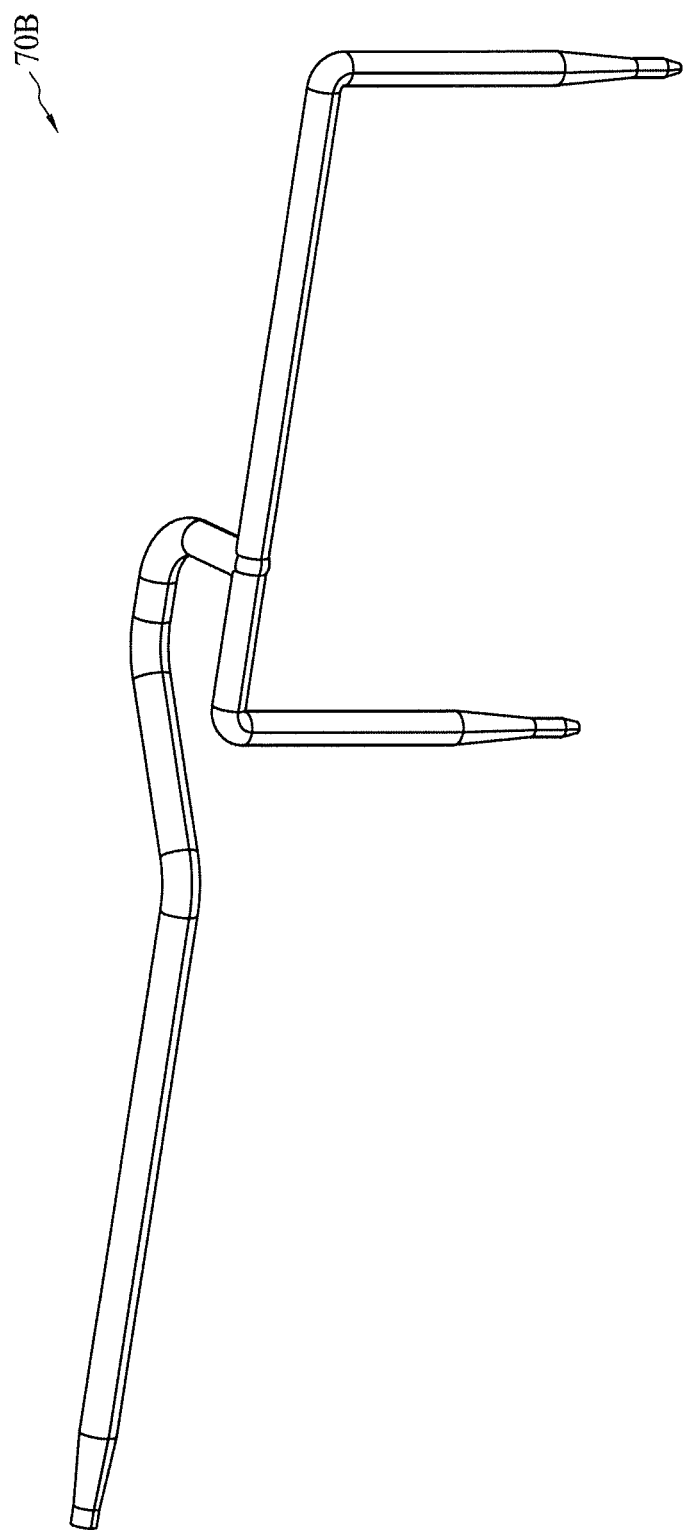
Figure 12:
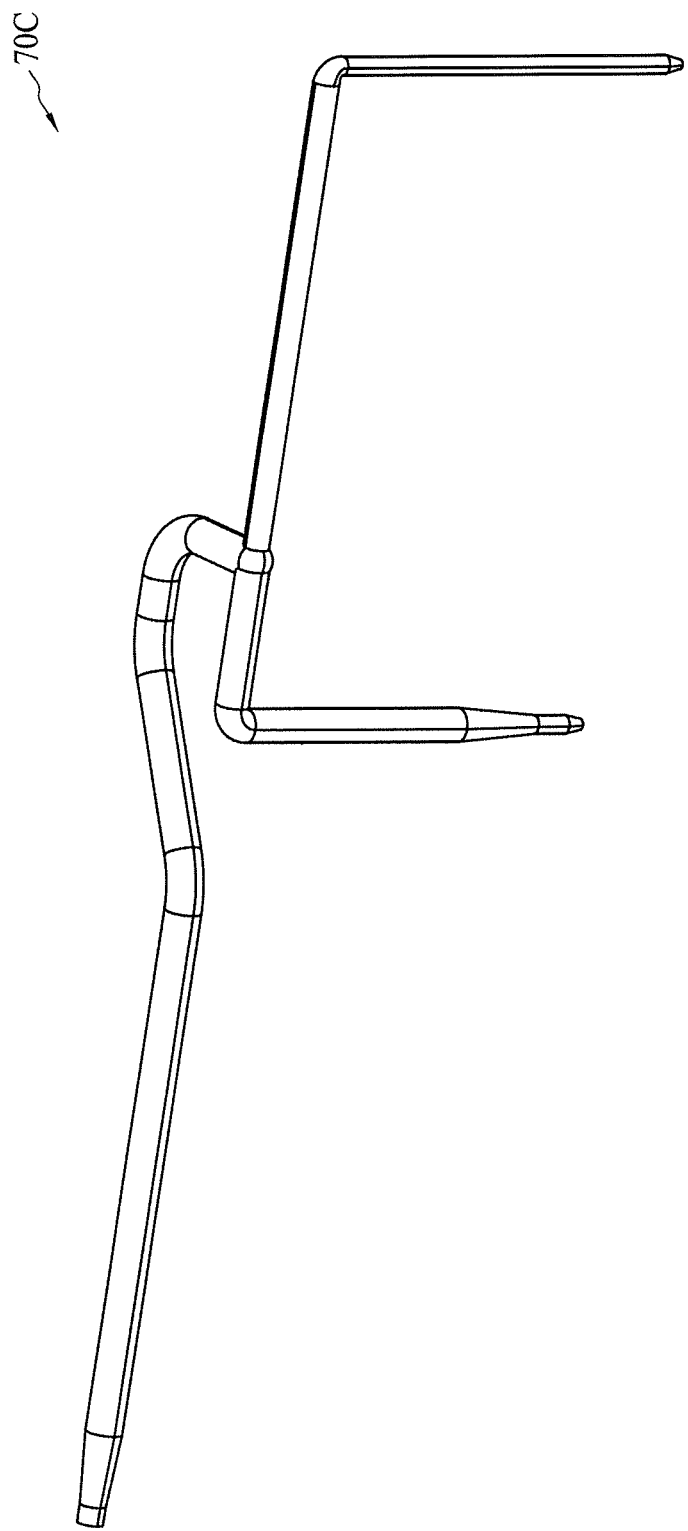
Figure 13:
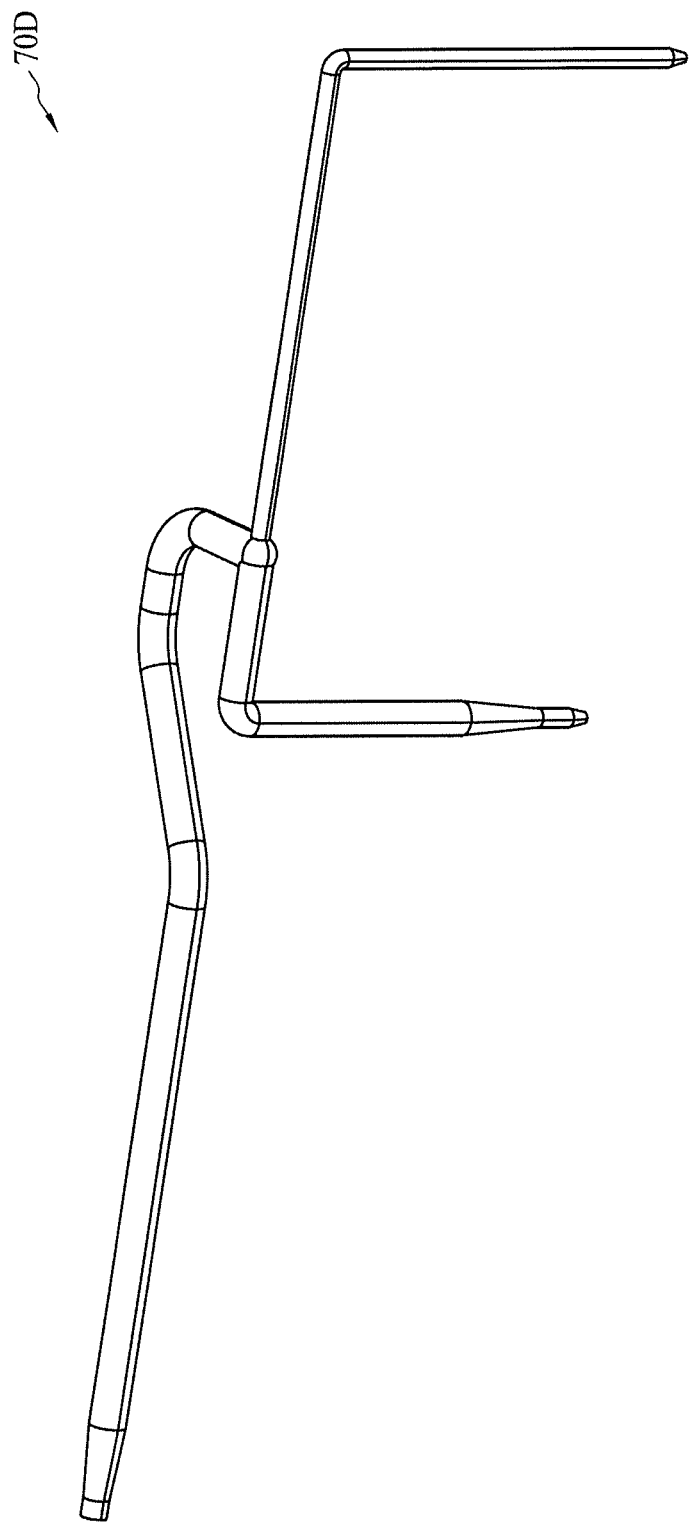
Figure 14:
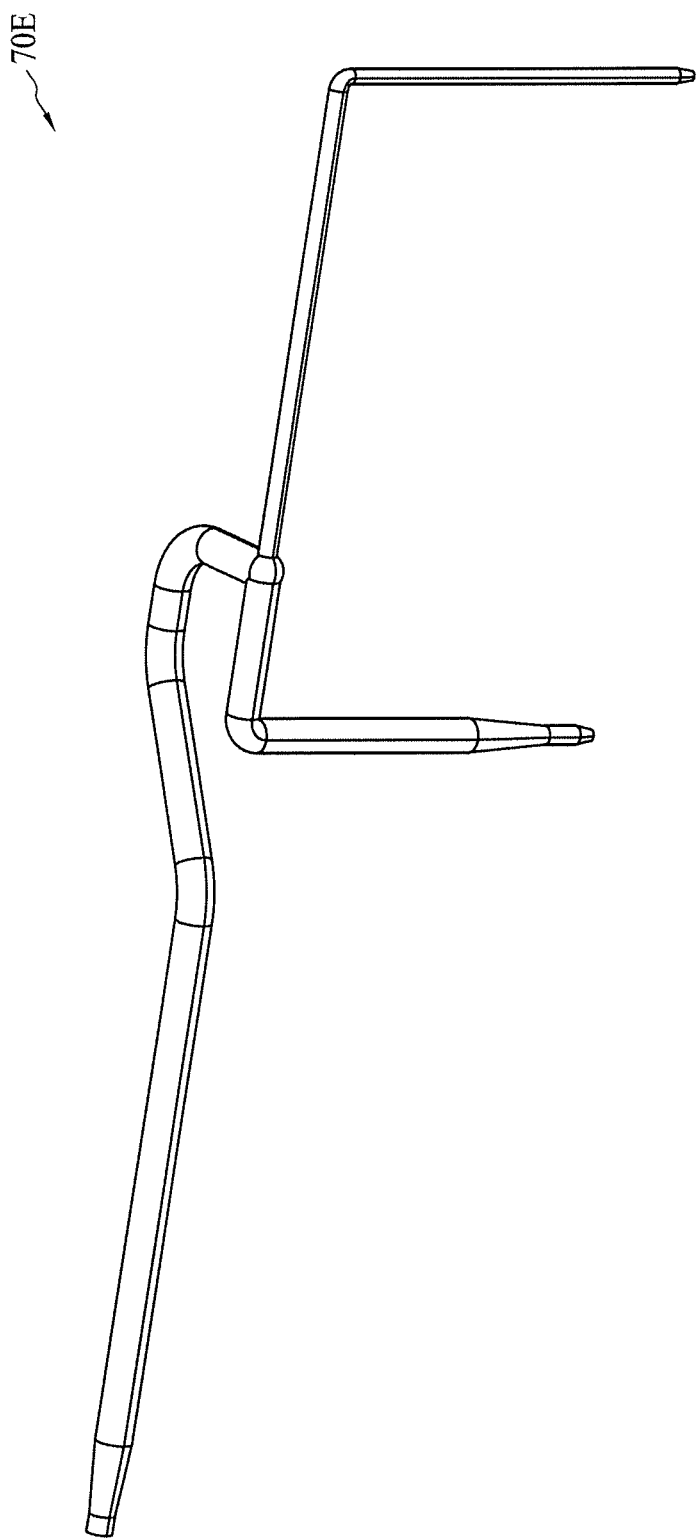
Figure 15:
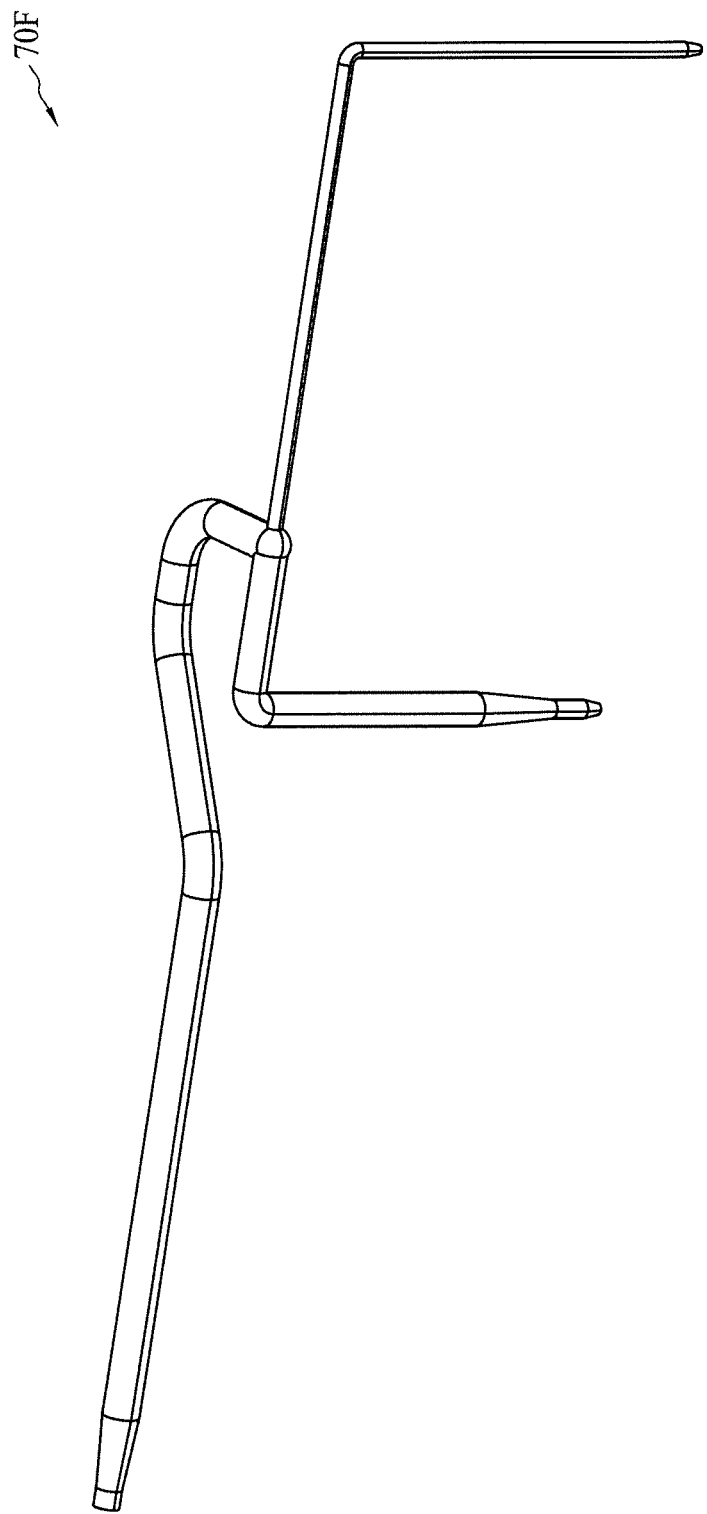

FIG. 9 is a plot showing the correlation between the injection (gate) pressure and the filling time for the cavity part 25 in accordance with various embodiments of the present disclosure. Referring to FIG. 6 and FIG. 9, in some embodiments, the transient state analysis comprises changing at least one of the first correlation and the second correlation by taking into consideration the adding of at least one redundant runner 25C in the cavity part 25, wherein the adding of the at least one redundant runner 25C in the cavity part 25 compensates a volume difference between the first cavity 25A and the second cavity 25B. In some embodiments, the first cavity 25A has a first volume, the second cavity 25B has a second volume smaller than the first volume, the redundant runner 23C has a third volume, and a summation of the third volume and the second volume is substantially the same as the first volume.

In some embodiments, the transient state analysis calculates the average pressure of the first minimum pressure and the second minimum pressure, and sets the target filling time ($t_{target}$) of the cavity part 25 to be the corresponding filling time of the average pressure. In some embodiments, the transient state analysis calculates the minimum pressure of the summation curve of the first correlation and the second correlation, and sets the filling time of the cavity part 25 to be the corresponding filling time of the minimum pressure. In addition, once the filling time of the cavity part 25 is set, the first filling rate ($Q_A$) of the first cavity 25A can be calculated from the filling time and the first volume, and the first inlet pressure of the first cavity 25A can be determined from the first correlation by using the filling time; similarly, the second filling rate ($Q_B$) of the second cavity 25B can be calculated from the filling time and the second volume, and the second inlet pressure can be determined from the second correlation by using the filling time.

FIGS. 10-15 are schematic views of a plurality of runner designs 70A-70F for the runner part 23 in accordance with various embodiments of the present disclosure. In the step 35, a steady state analysis is performed so as to calculate flow conditions of the plurality of runner designs 70A-70F for the runner part 23 by taking into consideration the filling condition of the cavity part 25, wherein the flow conditions comprise a first flow rate of the molding material 16 in the first runner 23A and a second flow rate of the molding material 16 in the second runner 23B.

The flow phenomena of the molding material 16 in the runner part 23 can be simulated by using the following governing equations (5)-(8).

$$\nabla \cdot \rho u = 0 \quad (5)$$

$$\nabla \cdot (\rho u u + \tau) = -\nabla p + \rho g \quad (6)$$

$$\rho C_P (u \cdot \nabla T) = \nabla (k \nabla T) + \eta \dot{\gamma}^2 \quad (7)$$

$$\tau = -\eta(T, \dot{\gamma}) \cdot (\nabla u + \nabla u^T) \quad (8)$$

The solving of the governing equations (5)-(8) is a steady state analysis, which can be performed numerically by using the computer. In the steady state analysis, the process variables that change with time are zero; i.e., the partial derivatives (∂/∂t) in the governing equations (1)-(4) are considered zero. In contrast, in the transient state analysis, the process variables that change with time are not zero; i.e., the partial derivatives (∂/∂t) in the governing equations (1)-(4) are not considered zero. The flow rate of the molding material 16 in the runner part 23 may change with respect to the outlet pressure, the inlet flow rate, the shape and geometry, and the runner designs.

In some embodiments, the steady state analysis comprises setting a first outlet pressure of the first runner 23A by taking into consideration the filling time of the cavity part 25 and the first correlation, and setting a second outlet pressure of the second runner 23B by taking into consideration the filling time of the cavity part 25 and the second correlation. In some embodiments, the steady state analysis sets the first outlet pressure of the first runner 23A to be the first inlet pressure of the first cavity 25A and sets the second outlet pressure of the second runner 23B to be the second inlet pressure of the second cavity 25B. In some embodiments, the first inlet pressure of the first cavity 25A is the gate pressure of the first correlation corresponding to the target filling time ($t_{target}$) of the cavity part 25, and the second inlet pressure of the second cavity 25B is the gate pressure of the second correlation corresponding to the target filling time of the cavity part 25.

In some embodiments, the steady state analysis comprises setting an inlet flow rate of the master runner 23C by taking into consideration the first filling rate corresponding to the first inlet pressure and the second filling rate corresponding to the second inlet pressure. In some embodiments, the steady state analysis comprises setting the inlet flow rate of the master runner 23C to be the summation of the first filling rate of the first cavity 23A and the second filling rate of the second cavity 23B.

Figure 16:
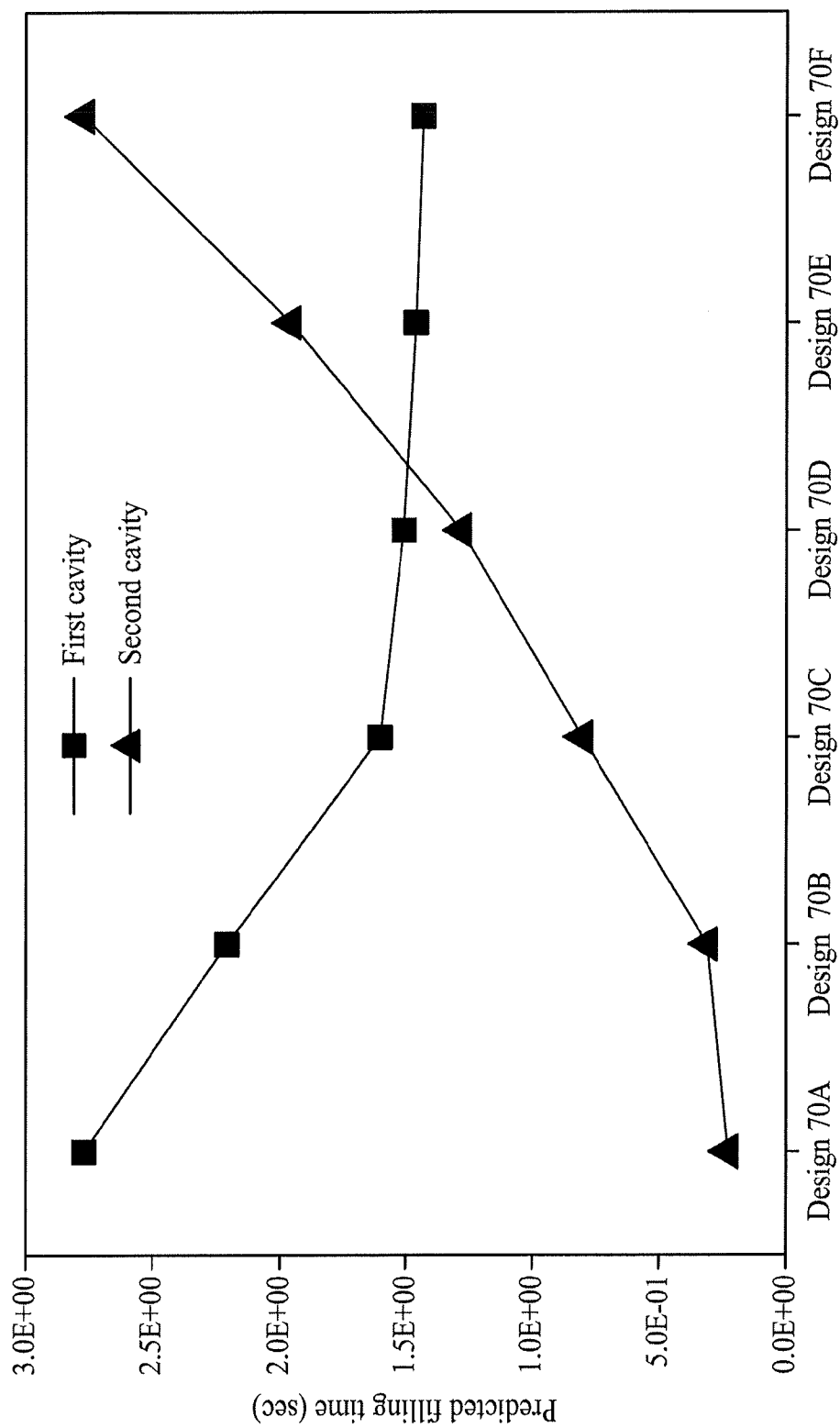
FIG. 16 is a chart showing the predicted filling times for the first cavity and the second cavity by using runner designs shown in FIGS. 10-15.
Figure 17:
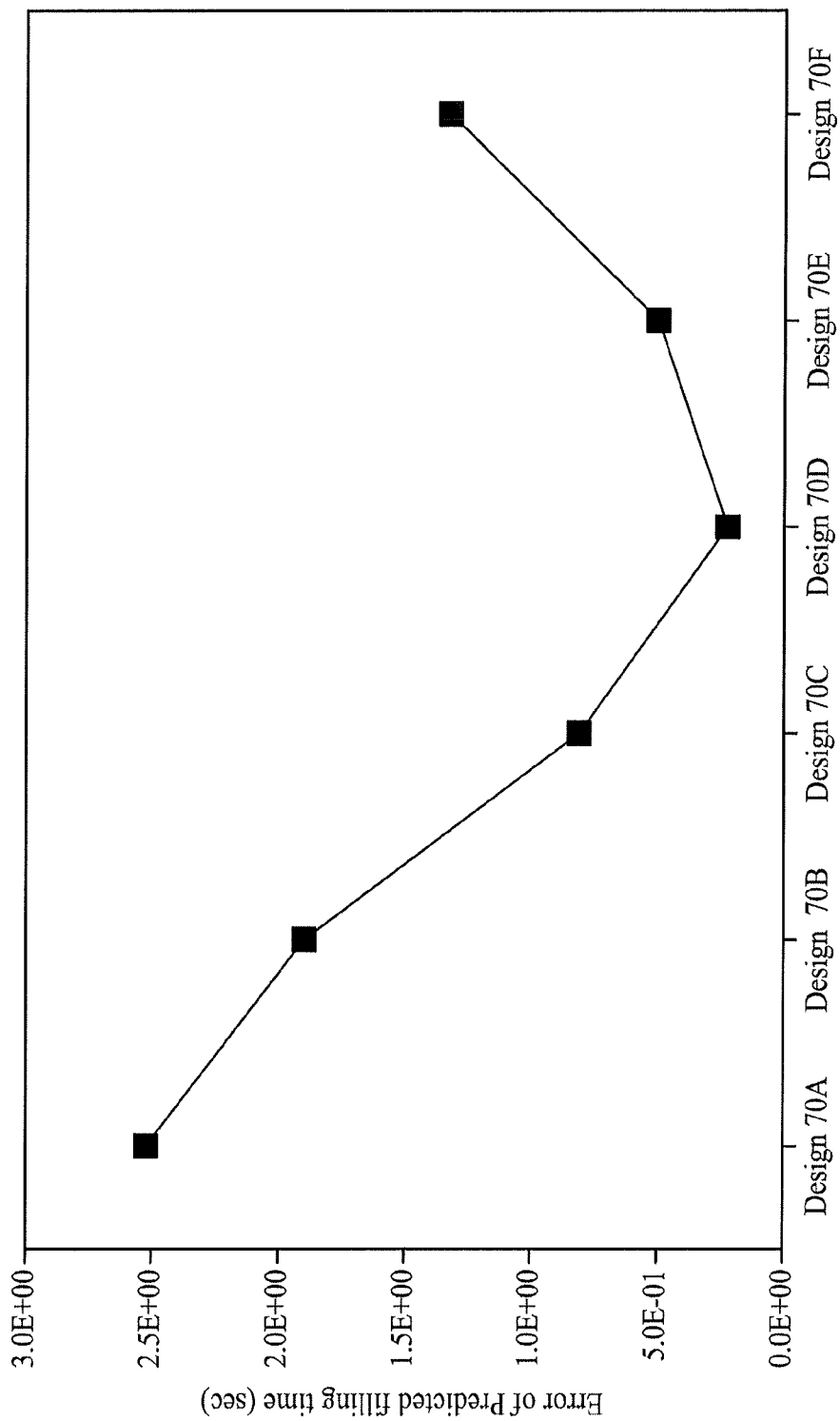
FIG. 17 is a chart showing the summation error of the predicted filling times for the first cavity and the second cavity by using runner designs shown in FIGS. 10-15.

FIG. 16 is a chart showing the predicted filling times for the first cavity 23A and the second cavity 23B by using runner designs 70A-70F shown in FIGS. 10-15. In some embodiments, the steady state analysis comprises calculating a first predicted filling time ($t_A$) by taking into consideration the inlet flow rate of the master runner 23C and the first outlet pressure of the first runner 23A, calculating a second predicted filling time ($t_B$) by taking into consideration the inlet flow rate of the master runner 23C and the second outlet pressure of the second runner 23B, and selecting one of the runner designs 70A-70F by taking into consideration the first predicted filling time ($t_A$) and the second predicted filling time ($t_B$).

FIG. 16 is a chart showing the error of the predicted filling times for the first cavity 23A and the second cavity 23B by using runner designs 70A-70F shown in FIGS. 10-15, and FIG. 17 is a chart showing the summation error of the predicted filling times for the first cavity 23A and the second cavity 23B by using runner designs 70A-70F shown in FIGS. 10-15. In some embodiments, the error of the predicted filling time is defined as follows:

Error=|$t_i$-$t_{target}$|

In some embodiments, the simulating method selects the runner design with the smallest error between the predicted filling time and the target filling time. The following table shows the first filling rate ($Q_A$), the first predicted filling time ($t_A$), the second filling rate ($Q_B$), the second predicted filling time ($t_B$), the error of the predicted filling time, and the computing time (the CPU time) of the runner designs 70A-70F.

|  | $Q_A$ (cc/sec) | $t_A$ (sec) | $Q_B$ (cc/sec) | $t_B$ (sec) | Error (sec) | CPU time (sec) |
| --- | --- | --- | --- | --- | --- | --- |
| Design 70A | 15.590 | 2.770 | 15.639 | 0.233 | 2.537 | 46 |
| Design 70B | 19.481 | 2.217 | 11.748 | 0.310 | 1.907 | 46 |
| Design 70C | 26.672 | 1.619 | 4.555 | 0.800 | 0.819 | 14 |
| Design 70D | 28.405 | 1.520 | 2.822 | 1.291 | 0.229 | 16 |
| Design 70E | 29.378 | 1.470 | 1.849 | 1.970 | 0.500 | 11 |
| Design 70F | 29.912 | 1.444 | 1.315 | 2.771 | 1.327 | 15 |

In the transient state analysis, the process variables that change with time are not zero; i.e., the partial derivatives (∂/∂t) in the governing equations (1)-(4) are not considered zero. Conventionally, the transient state analysis is performed to the full simulating domain 60 including the cavity part 25 and the runner part 23, i.e., the full simulation method. However, numerical solving of the governing equations by using the computer takes time.

In the steady state analysis in some embodiments of the present disclosure, the process variables that change with time are zero; i.e., the partial derivatives (∂/∂t) in the governing equations are considered zero. By assuming the flow of the molding material 16 in the runner part 23 is in the steady state, the embodiments of the present disclosure simplify the numerical solving of the governing equations for the runner part 23. The following table shows the computing time (the CPU time) of the runner designs 70A-70F by using the composite simulation method and the conventional full simulation method. Compared to the conventional full simulation method, the computing time can be dramatically decreased by using the composite simulation method according to some embodiments of the present disclosure.

|  | full simulation method (Second) | composite simulation method (Second) |
| --- | --- | --- |
| Design 70A | 436 | 46 |
| Design 70B | 404 | 46 |
| Design 70C | 485 | 14 |
| Design 70D | 642 | 16 |
| Design 70E | 536 | 11 |
| Design 70F | 707 | 15 |

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perforin substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer-implemented simulation method for use in a molding process by a computer processor, comprising:
   specifying a simulating domain having a cavity part and a runner part, wherein the cavity part comprises a first cavity and a second cavity, and the runner part comprises a first runner connected to the first cavity through a first gate and a second runner connected to the second cavity through a second gate;
   setting a filling condition of the cavity part without taking into consideration the runner part, wherein the filling condition comprises a first gate pressure of the first gate and a first filling rate of the first cavity, and a second gate pressure of the second gate and a second filling rate of the second cavity;
   performing a steady state analysis to calculate flow conditions of a plurality of runner designs for the runner part by taking into consideration the filling condition of the cavity part, wherein the flow conditions comprise a first flow rate of a molding material in the first runner and a second flow rate of the molding material in the second runner; and
   setting the filling condition and the flow conditions to on an injection machine using a controller,
   wherein the setting of the filling condition of the cavity part comprises performing a transient state analysis;
   the transient state analysis comprises generating a first correlation between the first gate pressure and the first filling rate and generating a second correlation between the second gate pressure and the second filling rate;
   the transient state analysis comprises setting a filling time of the cavity part by taking into consideration a first minimum pressure of the first correlation and a second minimum pressure of the second correlation; and
   the transient state analysis comprises changing at least one of the first correlation and the second correlation by taking into consideration that the cavity part has at least one redundant runner.

2. The computer-implemented simulation method for use in the molding process of claim 1, wherein the at least one redundant runner in the cavity part compensates a volume difference between the first cavity and the second cavity.

3. The computer-implemented simulation method for use in the molding process of claim 2, wherein the first cavity has first volume, the second cavity has a second volume smaller than the first volume, the at least one redundant runner has a third volume, and a summation of the third volume and the second volume is substantially the same as the first volume.

4. The computer-implemented simulation method for use in the molding process of claim 1, wherein the steady state analysis comprises setting a first outlet pressure of the first runner by taking into consideration the filling time of the cavity part and the first correlation, and setting a second outlet pressure of the second runner by taking into consideration the filling time of the cavity part and the second correlation.

5. The computer-implemented simulation method for use in the molding process of claim 4, wherein the runner part comprises a master runner connected to the first runner and the second runner, and the steady state analysis comprises setting an inlet flow rate of the master runner by taking into consideration the first filling rate corresponding to the first minimum pressure and the second filling rate corresponding to the second minimum pressure.

6. The computer-implemented simulation method for use in the molding process of claim 5, wherein the steady state analysis comprises calculating a first predicted filling time by taking into consideration the inlet flow rate of the master runner and the first outlet pressure, calculating a second predicted filling time by taking into consideration the inlet flow rate of the master runner and the second outlet pressure, and the simulation method comprises selecting one of the runner designs by taking into consideration the first predicted filling time and the second predicted filling time.

7. A non-transitory computer medium containing computer instructions stored therein for causing a computer processor to perform operations for use in a molding process simulation, the operations comprising:
   specifying a simulating domain having a cavity part and a runner part, wherein the cavity part comprises a first cavity and a second cavity, and the runner part comprises a first runner connected to the first cavity through a first gate and a second runner connected to the second cavity through a second gate;
   setting a filling condition of the cavity part without taking into consideration the runner part, wherein the filling condition comprises a first gate pressure and a first filling rate of the first cavity, and a second gate pressure and a second filling rate of the second cavity;
   performing a steady state analysis to calculate flow conditions of a plurality of runner designs for the runner part by taking into consideration the filling condition of the cavity part, wherein the flow conditions comprise a flow rate of a molding material flowing into the cavity part; and
   setting the filling condition and the flow conditions to on an injection machine using a controller,
   wherein he setting of the filling condition of the cavity part comprises performing a transient state analysis;
   the transient state analysis comprises generating a first correlation between the first gate pressure and the first filling rate and generating a second correlation between the second gate pressure and the second filling rate;
   the transient state analysis comprises setting a filling time of the cavity part by taking into consideration a first minimum pressure of the first correlation and a second minimum pressure of the second correlation; and
   the transient state analysis comprises changing at least one of the first correlation and the second correlation by taking into consideration that the cavity part has at least one redundant runner.

8. The non-transitory computer medium of claim 7, wherein the at least one redundant runner in the cavity part compensates a volume difference between the first cavity and the second cavity.

9. The non-transitory computer medium of claim 8, wherein the first cavity has first volume, the second cavity has a second volume smaller than the first volume, the at least one redundant runner has a third volume, and a summation of the third volume and the second volume is substantially the same as the first volume.

10. The non-transitory computer medium of claim 7, wherein the steady state analysis comprises setting a first outlet pressure of the first runner by taking into consideration the filling time of the cavity part and the first correlation, and setting a second outlet pressure of the second runner by taking into consideration the filling time of the cavity part and the second correlation.

11. The non-transitory computer medium of claim 10, wherein the runner part comprises a master runner connected to the first runner and the second runner, and the steady state analysis comprises setting an inlet flow rate of the master runner by taking into consideration the first filling rate corresponding to the first minimum pressure and the second filling rate corresponding to the second minimum pressure.

12. The non-transitory computer medium of claim 11, wherein the steady state analysis comprises calculating a first predicted filling time by taking into consideration the inlet flow rate of the master runner and the first outlet pressure, calculating a second predicted filling time by taking into consideration the inlet flow rate of the master runner and the second outlet pressure, and the simulation method comprises selecting one of the runner designs by taking into consideration the first predicted filling time and the second predicted filling time.

\* \* \* \* \*